United States Patent
Ohsawa

(10) Patent No.: US 8,237,948 B2
(45) Date of Patent: Aug. 7, 2012

(54) DOCUMENT MONITOR DEVICE, RECORDING MEDIUM STORING DOCUMENT MONITOR PROGRAM, DOCUMENT MONITOR SYSTEM, AND DOCUMENT MONITOR METHOD

(75) Inventor: Takashi Ohsawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 917 days.

(21) Appl. No.: 12/040,975

(22) Filed: Mar. 3, 2008

(65) Prior Publication Data

US 2009/0051961 A1 Feb. 26, 2009

(30) Foreign Application Priority Data

Aug. 24, 2007 (JP) .................... 2007-218324

(51) Int. Cl.
- G06F 3/12 (2006.01)
- G06F 7/04 (2006.01)
- H04N 1/00 (2006.01)

(52) U.S. Cl. ............. 358/1.14; 358/1.13; 358/1.15; 726/27; 726/28; 726/29; 726/30; 726/31; 726/32

(58) Field of Classification Search ............ None
See application file for complete search history.

(56) References Cited

U.S. PATENT DOCUMENTS

| | | | |
|---|---|---|---|
| 2005/0171914 A1* | 8/2005 | Saitoh | 705/51 |
| 2006/0290967 A1* | 12/2006 | Sumitomo et al. | 358/1.14 |
| 2007/0013945 A1* | 1/2007 | Yoshida et al. | 358/1.15 |

FOREIGN PATENT DOCUMENTS

| | | | |
|---|---|---|---|
| JP | 2005-157569 A | 6/2005 |
| JP | 2005-311813 A | 11/2005 |

* cited by examiner

*Primary Examiner* — Benny Q Tieu
*Assistant Examiner* — Haris Sabah
(74) *Attorney, Agent, or Firm* — Sughrue Mion, PLLC

(57) ABSTRACT

A document monitor device, which includes: a confidential information storage section that stores confidentiality level information of documents managed in a document management device associated with identification information of each of the documents; a feature storage section that stores features of the documents associated with the identification information; a selection section that selects a target document from the managed documents based on the confidentiality level information; an acquisition section that acquires a target image to be processed by an image processing device; an extraction section that extracts features of the target image; a similarity level calculation section that calculates a similarity level between the features stored in association with the identification information of the selected target document and the extracted features; and a detection information output section that, when the similarity level is a prescribed value or over, outputs information indicating that a similar image is detected.

10 Claims, 10 Drawing Sheets

SETTING SCREEN FOR IMAGE LOG CHECK

| | | | PRIORITY ORDER | |
|---|---|---|---|---|
| CONFIDENTIALITY LEVEL: | A ▼ | OR OVER | 1 ▼ | |
| FRESHNESS LEVEL: | C ▼ | OR OVER | 3 ▼ | |
| DISTRIBUTION LEVEL: | B ▼ | OR OVER | 2 ▼ | |

SET

FIG.3A

CONFIDENTIAL DOCUMENTS MANAGED IN DMS

| | DOCUMENT ID | CONFIDENTIALITY LEVEL | FRESHNESS LEVEL | DISTRIBUTION LEVEL |
|---|---|---|---|---|
| CHECK AT REAL TIME | 4 | A | A | A |
| | 1 | A | C | B |
| CHECK AT IDLE TIME | 3 | B | A | A |
| | 2 | B | B | B |
| | 5 | C | A | C |

| | |
|---|---|
| MONDAY | 0:00~8:00<br>22:00~24:00 |
| TUESDAY | 0:00~8:00<br>22:00~24:00 |
| WEDNESDAY | 0:00~8:00<br>22:00~24:00 |
| THURSDAY | 0:00~8:00<br>22:00~24:00 |
| FRIDAY | 0:00~8:00<br>22:00~24:00 |
| SATURDAY | 0:00~24:00 |
| SUNDAY | 0:00~24:00 |

FIG.6

| AT REAL TIME | AT IDLE TIME | DATE AND TIME | USER | IMAGE LOG ID | JOB | RECORD LOCATION | SIMILAR CONFIDENTIAL DOCUMENT ID | FILE NAME | DMS STORE LOCATION | CONFIDENTIALITY LEVEL | FRESHNESS LEVEL | DISTRIBUTION LEVEL | SIMILARITY LEVEL | CHECK |
|---|---|---|---|---|---|---|---|---|---|---|---|---|---|---|
| DONE | DONE | 03. JUL. 10:33:24 | A | C12322-11bd-80 | MailBox | /A/C/... | 01-213651 | Body.doc | /project1/... | A | C | C | 9 | CHECKED |
| DONE | DONE | 03. JUL. 10:34:14 | B | C15222-11db-80 | Print | /A/C/... | | | | | | | | |
| DONE | | 04. JUL. 13:30:59 | A | 842329-11db-89 | Print | /A/D/... | 02-213651 | 88.ppt | /project1/... | B | B | C | 8 | CHECKED |
| DONE | | 04. JUL. 13:31:24 | C | 842329-11db-80 | Print | /A/C/... | | | | | | | | |
| DONE | | 04. JUL. 13:31:33 | F | 90232c-11db-80 | Print | /A/A/... | 06-554874 | Report1.doc | /project5/... | C | A | A | 8 | CHECKED |
| DONE | | 04. JUL. 13:31:15 | E | 90232c-11db-80 | Copy | /A/C/... | 01-845462 | renraku.xls | /project1/... | A | B | B | 9 | CHECKED |
| DONE | | 04. JUL. 13:52:36 | A | 952337-11db-80 | Copy | /A/F/... | | | | | | | | |
| DONE | | 04. JUL. 13:52:55 | A | 942337-11db-80 | Print | /A/B/... | | | | | | | | |
| DONE | | 04. JUL. 14:10:57 | B | 24233e-11db-80 | Print | /A/C/... | | | | | | | | |
| DONE | | 04. JUL. 14:11:13 | C | 24233e-11db-86 | Print | /A/B/... | 04-984621 | 060202_1.xls | /project1/... | C | C | A | 9 | CHECKED |

FIG.8

SETTING SCREEN FOR IMAGE LOG CHECK

|  | PRIORITY ORDER |
|---|---|
| CONFIDENTIALITY LEVEL: | 1 ▼ |
| FRESHNESS LEVEL: | 3 ▼ |
| DISTRIBUTION LEVEL: | 2 ▼ |

MAXIMUM NUMBER FOR CHECKING: 3 DOCUMENTS

SET

FIG.9A

CONFIDENTIAL DOCUMENTS MANAGED IN DMS

| | DOCUMENT ID | CONFIDENTIALITY LEVEL | FRESHNESS LEVEL | DISTRIBUTION LEVEL | |
|---|---|---|---|---|---|
| CHECK AT REAL TIME | 4 | A | A | A | TOP THREE DOCUMENTS |
| | 1 | A | C | B | |
| | 3 | B | A | A | |
| CHECK AT IDLE TIME | 2 | B | B | B | |
| | 5 | C | A | C | |

FIG.9B

SETTING SCREEN FOR IMAGE LOG CHECK

PRIORITY ORDER

CONFIDENTIALITY LEVEL: [1 ▼]

FRESHNESS LEVEL: [3 ▼]

DISTRIBUTION LEVEL: [2 ▼]

<TIME FOR SIMILARITY DETERMINATION>

(1) AT REAL TIME : TOP [1] PLACE~ [2] PLACE (2) AT REAL TIME (PROCESSABLE BY MANAGER'S APPROVAL) : TOP [3] PLACE~ [4] PLACE (3) AT THE TIME OF LOW CPU UTILIZATION RATE : TOP [5] PLACE~ [6] PLACE (4) AT PRESET TIME SUCH AS NIGHTTIME : TOP [7] PLACE ~

( SET )

FIG.10A

CONFIDENTIAL DOCUMENTS MANAGED IN DMS

| | DOCUMENT ID | CONFIDENTIALITY LEVEL | FRESHNESS LEVEL | DISTRIBUTION LEVEL |
|---|---|---|---|---|
| AT REAL TIME (PROHIBITING PROCESS EVEN BY MANAGER'S APPROVAL) | 4 | A | A | A |
| | 1 | A | B | A |
| AT REAL TIME (PROCESSABLE BY MANAGER'S APPROVAL) | 6 | A | C | A |
| | 2 | A | B | B |
| AT THE TIME OF LOW CPU UTILIZATION RATE | 8 | B | A | A |
| | 10 | B | B | A |
| NIGHTTIME AND SO ON | 7 | B | C | B |
| | 3 | B | A | C |
| | 9 | C | B | B |
| | 5 | C | A | C |

DOCUMENT MONITOR DEVICE, RECORDING MEDIUM STORING DOCUMENT MONITOR PROGRAM, DOCUMENT MONITOR SYSTEM, AND DOCUMENT MONITOR METHOD

CROSS-REFERENCE TO RELATED APPLICATION

This application is based on and claims priority under 35 USC 119 from Japanese Patent Application No. 2007-218324 filed on Aug. 24, 2007.

BACKGROUND

1. Technical Field

The present invention relates to a document monitor device, a recording medium storing a document monitor program, a document monitor system, and a document monitor method.

2. Related Art

There have been developed various techniques for recording in a server an image log in which processing history information such as a date of use, a user name, operation information or a processing result is set with an image of document to be used so as to specify a usage status of a multifunctional device, a printing device or other devices.

Additionally, there has been provided a technique of an image log system in which, when the image log recorded in the manner described above and a document to be monitored (e.g. securities, confidential document) are compared and it is determined that both of them are matched, a notification to that effect is issued to a manager, or the determination is recorded as a monitor log to use for analyzing later.

SUMMARY

An aspect of the present invention provides a document monitor device, which includes: a confidential information storage section that stores confidentiality level information of documents managed in a document management device in association with identification information of each of the documents; a feature storage section that stores features of the documents managed in the document management device in association with the identification information; a selection section that selects a target document from the documents managed in the document management device based on the confidentiality level information stored in the confidential information storage section; an acquisition section that acquires a target image to be processed by an image processing device; an extraction section that extracts features of the target image acquired by the acquisition section; a similarity level calculation section that calculates a similarity level between the features stored in the feature storage section in association with the identification information of the target document selected by the selection section and the features extracted by the extraction section; and a detection information output section that, when the similarity level calculated by the similarity level calculation section is a prescribed value or over, outputs information indicating that a similar image is detected.

BRIEF DESCRIPTION OF THE DRAWINGS

An exemplary embodiment of the present invention will be described in detail based on the following figures, wherein:

FIGS. 3A and 3B are diagrams showing settings for selecting the confidential documents whose similarity is determined at the real time;

FIG. 6 is a table showing the time when the document monitor system 7 is at idle, which is set in advance;

FIG. 8 is a table showing a monitor log recorded by a monitor log record section 18;

FIGS. 9A and 9B are diagrams showing settings in which the confidential documents whose similarity is determined at the real time are selected by the quantity of the confidential documents; and FIGS. 10A and 10B are diagrams showing that confidential documents managed by a DMS 3 are separated into three or more types, and treatment for the similarity determination varies dependent on the separated type.

DETAILED DESCRIPTION

Hereinbelow, an example of the present invention will be described in detail with reference to the attached drawings.

First, a configuration of a document monitor system 7 in which a document monitor device 1 is employed will be described in detail with reference to FIG. 1.

Figure 1:
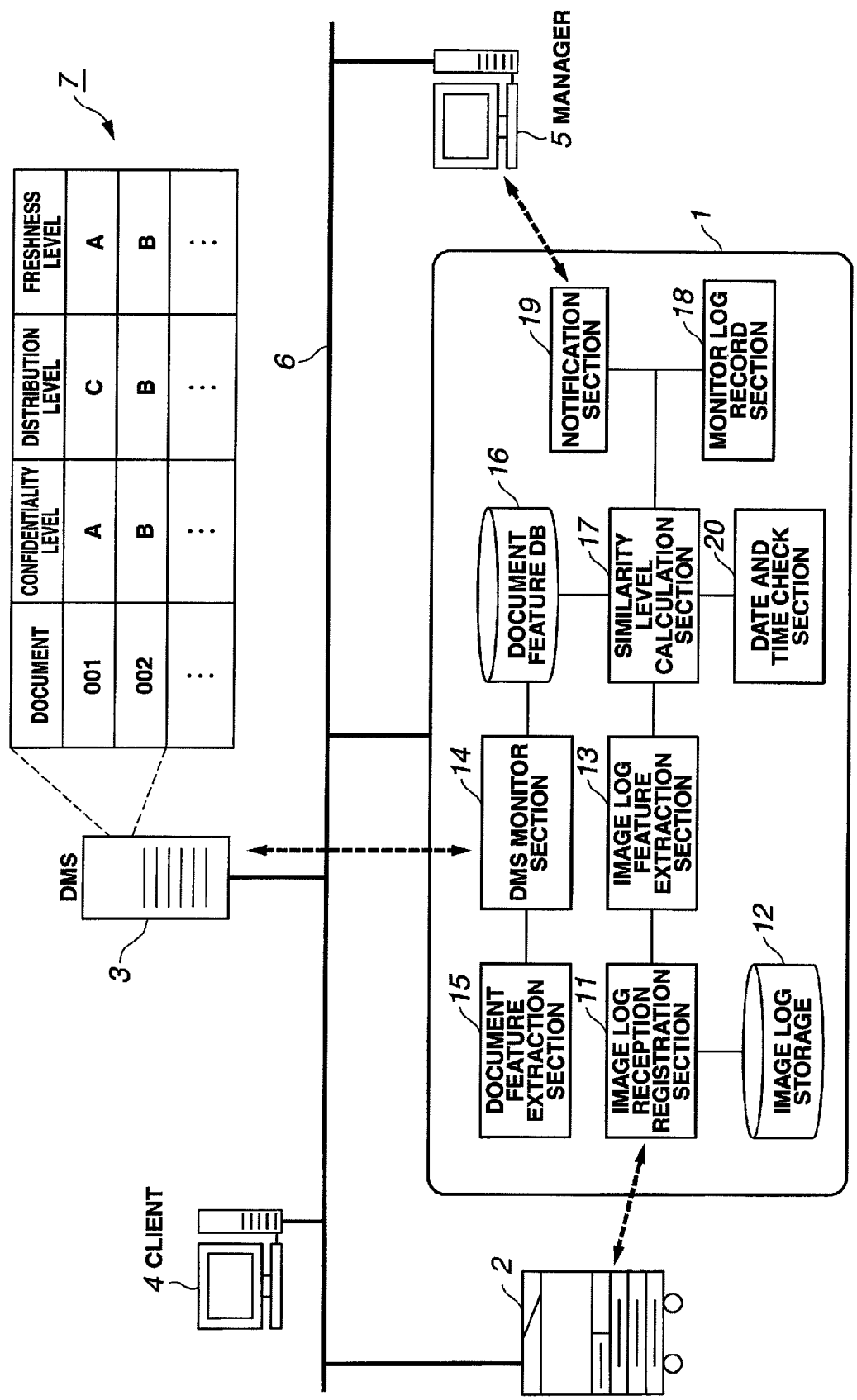
FIG. 1 is a configuration diagram of a document monitor system 7.

FIG. 1 is a diagram showing the configuration of the document monitor system 7 in which the document monitor device 1 according to the present invention is employed.

The document monitor system 7 includes the document monitor device 1, an image processing device 2, a DMS 3 (Document Management System that functions as a document management device), a client PC (Personal Computer) 4 and a manager PC 5, each of which is connected through a communication line 6.

The image processing device 2 is a device that performs printing, copying, scanning or other processes. The DMS 3 is a document management device that stores confidential documents. Access right in accordance with the confidentiality level attached to each of the confidential documents can be set and managed by the DMS 3. To the confidential documents managed by the DMS 3, the confidentiality level, a freshness level, a distribution level are attached as attachment information, each of which will be described in detail later. Information on who creates each of the confidential documents and the like is also managed. The client PC 4 is a client machine that implements a process of requesting printing to the image processing device 2 and the like. The manager PC 5 is a personal computer that is used by a manager of the DMS 3. The manager PC 5 receives a notice of warning from the document monitor device 1, and implements a process of issuing a notification of permission for the image processing device 2 to implement the requested process for the image log to which the warning is raised, and the like.

In the document monitor system 7, the DMS 3 manages the confidential documents. Immediately after the image processing device receives a request of processing a document, the document monitor device 1 determines whether or not the requested document is permitted or prohibited to be processed by the image processing device 2. Then, the image processing device 2 implements the process in accordance with the determined result.

The document monitor device 1 includes an image log reception registration section 11, an image log storage 12, an image log feature extraction section 13, a DMS monitor section 14, a document feature extraction section 15, a document feature DB (Data Base) 16, a similarity level calculation section 17, a monitor log record section 18, a notification section 19, and a date and time check section 20.

The image log reception registration section 11 receives the image log from the image processing device 2, and saves the received image log to the image log storage 12.

Here, the image log received from the image processing device 2 is formed with image data of a document, which is a processing-target image to be processed in the image processing device 2, and information indicating a job name, a user name, a data and time, a name of the image processing device or other details of processes.

The image log storage 12 may be formed with a hard disk or other storage devices, and stores the image log received from the image log reception registration section 11. Additionally, the image log storage 12 may store features extracted by the image log feature extraction section 13.

The image log feature extraction section 13 extracts, from the image log, features of the image data of the processing-target image to be processed in the image processing device 2. The processing of extracting the features will be described later based on related arts.

The DMS monitor section 14 checks whether or not there is any newly added confidential document in the DMS 3, or whether or not there is any update of the confidential document managed by the DMS 3. If there is a newly added or updated confidential document, the document feature extraction section 15 extracts features of the confidential document. Additionally, the DMS monitor section 14 registers to the document feature DB 16 features, basic attributes (file name, storage location, registration date, etc.), confidentiality level, distribution level, freshness level or the like of the newly added or updated confidential document managed in the DMS 3.

Here, there are two types of management manner for managing the freshness level by the DMS monitor section 14. As one management manner, the freshness level is managed by DMS 3 as similar to the confidentiality level and the distribution level. The DMS monitor section 14 checks the update of the confidentiality level, the distribution level and the freshness level managed by the DMS 3, and at the time of update, the DMS monitor section 14 performs updating the document feature DB 16. As another manner, the freshness level is managed separately from the confidentiality level and the distribution level managed in the DMS 3. The DMS monitor section 14 re-calculates the freshness level at regular intervals based on the elapsed time from the registered date (updated date) of the confidential document, and registers the contents of the re-calculation to the document feature DB 16.

The document feature extraction section 15 extracts features of the confidential document requested by the DMS monitor section 14.

The document feature DB 16 may be formed with a storage device such as a hard disk, and stores, in advance, features extracted by the document feature extraction section 15, basic attributes (file name, storage location, registration date, contact address of the creator of the confidential document, etc.), the confidentiality level and the like for each identification number uniquely designated to each of the confidential documents.

The similarity level calculation section 17 compares the features (features extracted from the image log of the processing-target image) extracted by the image log feature extraction section 13 with the features of the confidential document stored in the document feature DB 16, and calculates the similarity level to determine the similarity between the document to be processed by the image processing device 2 and the confidential document managed by the DMS 3, and the like. If the similarity level is high, it is determined that the document to be processed or document that is already processed by the image processing device 2 has a similarity with reference to the confidential document stored in the DMS 3, and warning information is sent to the manager PC 5.

The monitor log record section 18 records the result obtained by the similarity level calculation section 17 as a log.

The notification section 19 implements a process of sending the warning information to the manager PC 5 upon receiving a notification on the confidential document with high similarity level from the similarity level calculation section 17, and the like.

The date and time check section 20 internally has a function of checking the date and time. By setting in advance the time when processing load of the document monitor system 7 is assumed to be low, such as nighttime and weekend, the date and time check section 20 notifies the similarity level calculation section 17 to that effect at the preset time.

Additionally, the image log reception registration section 11, the image log feature extraction section 13, the DMS monitor section 14, the document feature extraction section 15, the similarity level calculation section 17, the monitor log record section 18, the notification section 19, and the date and time check section 20 in the document monitor device 1 may be performed by a program loaded in a RAM (Random Access Memory) in a computer. It should be noted that the monitor log recorded by the monitor log record section 18 may be recorded to a file in a hard disk or other recording device.

It should be noted that, in connection with the features used for determining the similarity, the features extracted by the image log feature extraction section 13 and the features extracted by the document feature extraction section 15 may be image features of the image data of the document, and may be keywords obtained from text information that is formed with characters extracted from the image data of the document. The present invention does not intend to limit the type of features to be used.

Additionally, in connection with the process of comparing the features of the image log with the features of the confidential documents and calculating the similarity level in the similarity level calculation section 17, when the features are image features, the similarity level is considered to become higher as the distance in a feature space obtained by analyzing the image becomes smaller. The present invention does not particularly limit the type of axis in the feature space in this case. Furthermore, in the processing of comparing the features of the image log with the feature of the confidential document and calculating the similarity level in the similarity level calculation section 17, when the features are keyword information, by analyzing a degree of match between the keywords obtained by analyzing the text that is formed with characters extracted by the image log feature extraction section 13 and the keywords extracted from the confidential document, the similarity level is considered to become higher as the degree of match in the keywords becomes higher. The present invention does not particularly limit the method of calculating the degree of match in the keywords in this case.

The technique of extracting features from the image data of the document and the technique of determining the similarity to other document as described earlier can be realized by using the following related arts: the Japanese Patent Application Laid-open No. 2001-256256 discloses a technique of determining the similarity by extracting the features from the electronic document data; the Japanese Patent Application Laid-open No. 2001-319232 determines the similarity by extracting the features from the image data; the Japanese Patent Application Laid-open No. 2001-160067 discloses a similar document searching method and a recommendation article notification service system that utilizes the similar document searching method; the Japanese Patent Application Laid-open No. 11-066086 discloses a similar document searching device and a similar document searching method; the Japanese Patent Application Laid-open No. 5-28198 discloses a document information searching device; the Japanese Patent Application Laid-open No. 2003-271956 discloses a image matching processing method; the Japanese Patent Application Laid-open No. 2004-252810 discloses a method of matching image and document, a device thereof and a matching program.

Next, of the confidential documents managed in the DMS 3, a determination target confidential document whose similarity is determined with reference to a document to be processed by the image processing device 2 immediately after the image processing device 2 receives a request of processing the document will be described with reference to FIG. 2.

Figure 2:
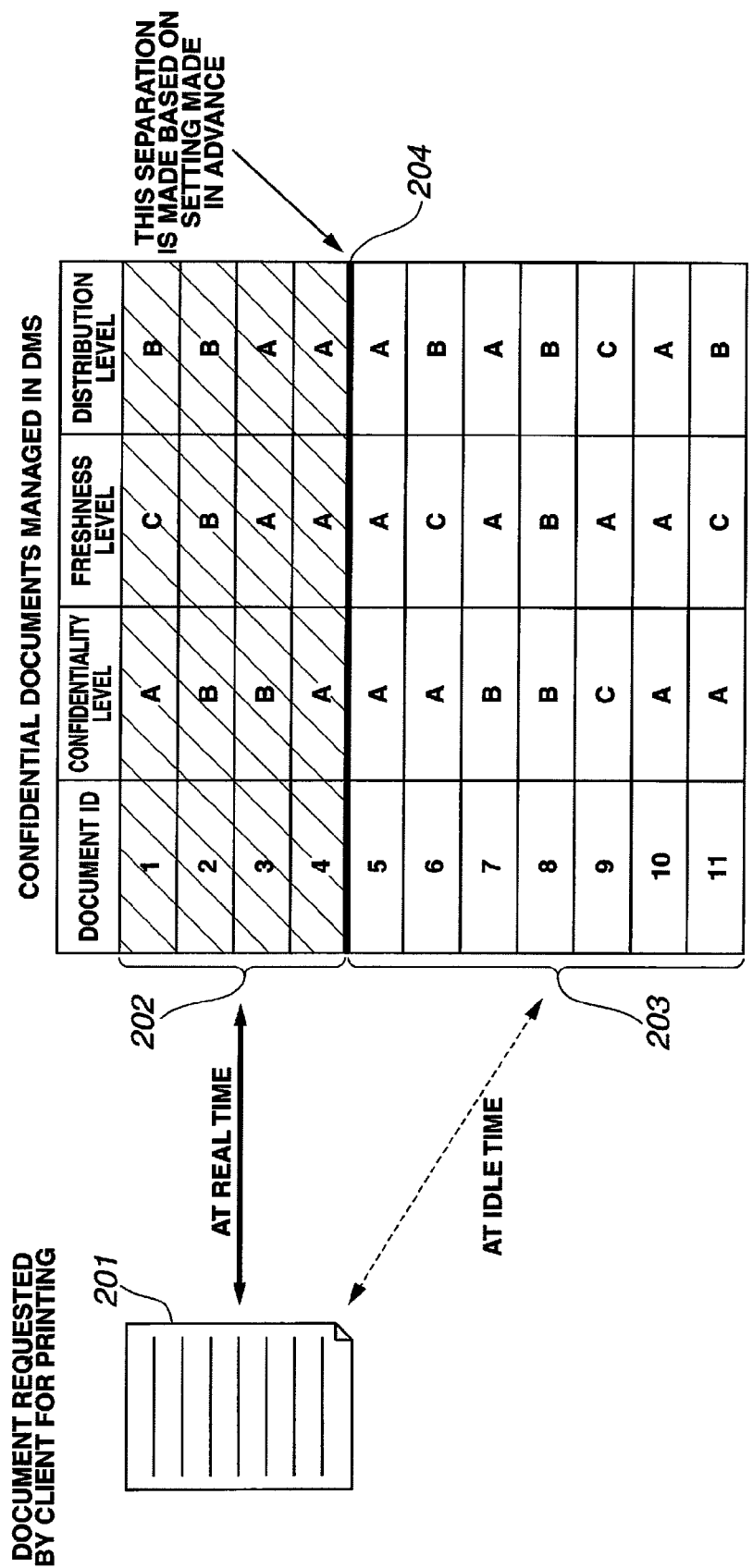
FIG. 2 is a schematic view showing a confidential document whose similarity is determined at a real time.

FIG. 2 is a schematic view showing confidential documents, among the confidential documents managed in the DMS 3, whose similarity is determined with reference to a document to be processed by the image processing device 2 immediately after the image processing device 2 receives a request of processing the document.

As shown in FIG. 2, the DMS 3 manages plural confidential documents. However, determining the similarity with reference to the document to be processed by the image processing device 2 immediately after the image processing device 2 receives a request of processing the document is limited to important confidential documents among the confidential documents managed in the DMS 3. As shown in FIG. 2, only the important confidential documents (reference numeral 202) shown in diagonally shaded area among the confidential documents managed in the DMS 3 are the determination target confidential documents whose similarity is determined with reference to the image log of the document to be processed by the image processing device 2 immediately after the image processing device 2 receives the request of processing the document.

The similarity of the remaining confidential documents managed in the DMS 3 (reference numeral 203) is determined with reference to the document 201 at the preset time such as nighttime or weekend, rather than immediately after the image processing device 2 receives the request of processing the document.

In other words, the confidential documents managed in the DMS 3 are separated into the important confidential documents (reference numeral 202) whose similarity is determined immediately after the image processing device 2 receives the request of processing the document 201 (hereinafter referred to as real time), and the confidential document (reference numeral 203) whose similarity is determined at the preset time such as nighttime or weekend (hereinafter referred to as idle time), rather than the real time. Thus, high load is not applied to the document monitor device 1 and the document monitor system 7 during the normal operation time.

Additionally, the separation of the confidential documents whether the similarity is determined at the real time or at the idle time is made based on the setting made in advance (reference numeral 204). It should be noted that in the document monitor system 7 the confidential documents are managed by the identification number uniquely designated to each of the confidential documents.

Next, with reference to FIGS. 3A and 3B, a description will be made of separating the confidential documents managed in the DMS 3 into the confidential documents whose similarity is determined at the real time and the confidential documents whose similarity is determined at the idle time.

FIGS. 3A and 3B are diagrams showing the separation between the confidential documents whose similarity is determined at the real time and the confidential documents whose similarity is determined at the idle time. FIG. 3A is a configuration diagram of a setting screen for selecting the confidential documents whose similarity is determined by the similarity level calculation section 17 in the document monitor device 1. FIG. 3B is a table showing the confidential documents selected as the confidential documents whose similarity is determined in accordance with the document selection conditions set in the setting screen in FIG. 3A.

As shown in FIG. 3A, selection of the confidential documents whose similarity is determined at the real time is made by setting document selection conditions, which includes information on the confidentiality level, the freshness level and the distribution level of the confidential documents to be selected, and a priority order indicating the priority among the confidentiality level, the freshness level and the distribution level. The screen for setting the confidentiality level, the freshness level and the distribution level is displayed on a display/operation section (not shown) provided to the document monitor device 1. The document selection conditions determined through the screen are stored in the similarity level calculation section 17. Alternatively, it may be possible to employ a configuration in which a screen is displayed on the client PC 4 or the manager PC 5, and the document selection conditions determined in the screen are stored in the similarity level calculation section 17.

Here, the confidentiality level refers to an index showing a degree of confidentiality of the confidential documents set in the DMS 3.

The distribution level refers to, for example, an index determined based on how many times each confidential document managed in the DMS 3 is downloaded by the user from the DMS 3. A confidential document that is frequently downloaded from the DMS 3 is defined as high distribution level. Specifically, for the confidential document that is downloaded 50 times or over, the distribution level is set to A; for the confidential document that is downloaded 10 times to less than 50 times, the distribution level is set to B; for the confidential document that is downloaded less than 10 times, the distribution level is set to C; and for the confidential document that is downloaded 0 times, the distribution level is set to D.

The freshness level refers to, for example, an index determined based on the elapsed time from the time when the document is registered to the DMS 3. The freshness level is defined such that the longer the elapsed time from the registration date and time to the DMS 3, the lower the freshness level. Specifically, when the elapsed time from the registration date of the confidential document to the DMS 3 is less than 30 days, the freshness level is set to A; when the elapsed time from the registration date is 30 days to less than 100 days, the freshness level is set to B; and when the elapsed time from the registration date is 100 days or longer, the freshness level is set to C.

It should be noted that, in the screen for selecting the confidential document whose similarity is determined at the real time as shown in FIG. 3A, the index to be set is not limited to the confidentiality level, freshness level and distribution level. It may be possible to employ a configuration in which the confidential document whose similarity is determined at the real time is selected by using other index related to the confidential document.

As described above, after the document selection conditions are set using the screen shown in FIG. 3A, identification numbers of the confidential documents are selected according to the set document selection conditions (confidential documents with the particular confidentiality level, freshness level and distribution level or over are selected), and the order for determining the similarity is set to the selected confidential documents in accordance with a set priority order. As a method for calculating the priority order, for example, when the conditions are set as shown in FIGS. 3A and 3B, documents having "the confidentiality level: A or over", which is the highest priority in the selection conditions of the document to be determined at the real time, are selected. Next, among the selected documents, documents having "the distribution level: B or over", which is the second highest priority in the conditions, are further selected. Then, among the further selected documents, documents having "the freshness level: C or over", which is the third highest priority in the conditions, are further selected. As a result, as shown in FIG. 3B, documents with document ID with 4 and 1 are selected as the document to be determined at the real time.

In accordance with the set order, the similarity level calculation section 17 determines the similarity in the order from the confidential document having the identification number with the highest priority.

Then, for the confidential documents (reference numeral 301) whose similarity is not determined at the real time as shown in FIG. 3B, the similarity with reference to the document to be processed in the image processing device 2 is determined at the idle time such as nighttime or weekend. The similarity between the documents to be processed by the image processing device 2 and the confidential documents managed in the DMS 3 is determined by calculating, by the similarity level calculation section 17, the similarity level between the features (features of the image log of the document to be processed by the image processing device 2) extracted by the image log feature extraction section 13 and the features of the confidential documents stored in the document feature DB 16.

Next, with reference to FIG. 4, a process implemented in the document monitor system 7 at the real time will be described.

Figure 4:
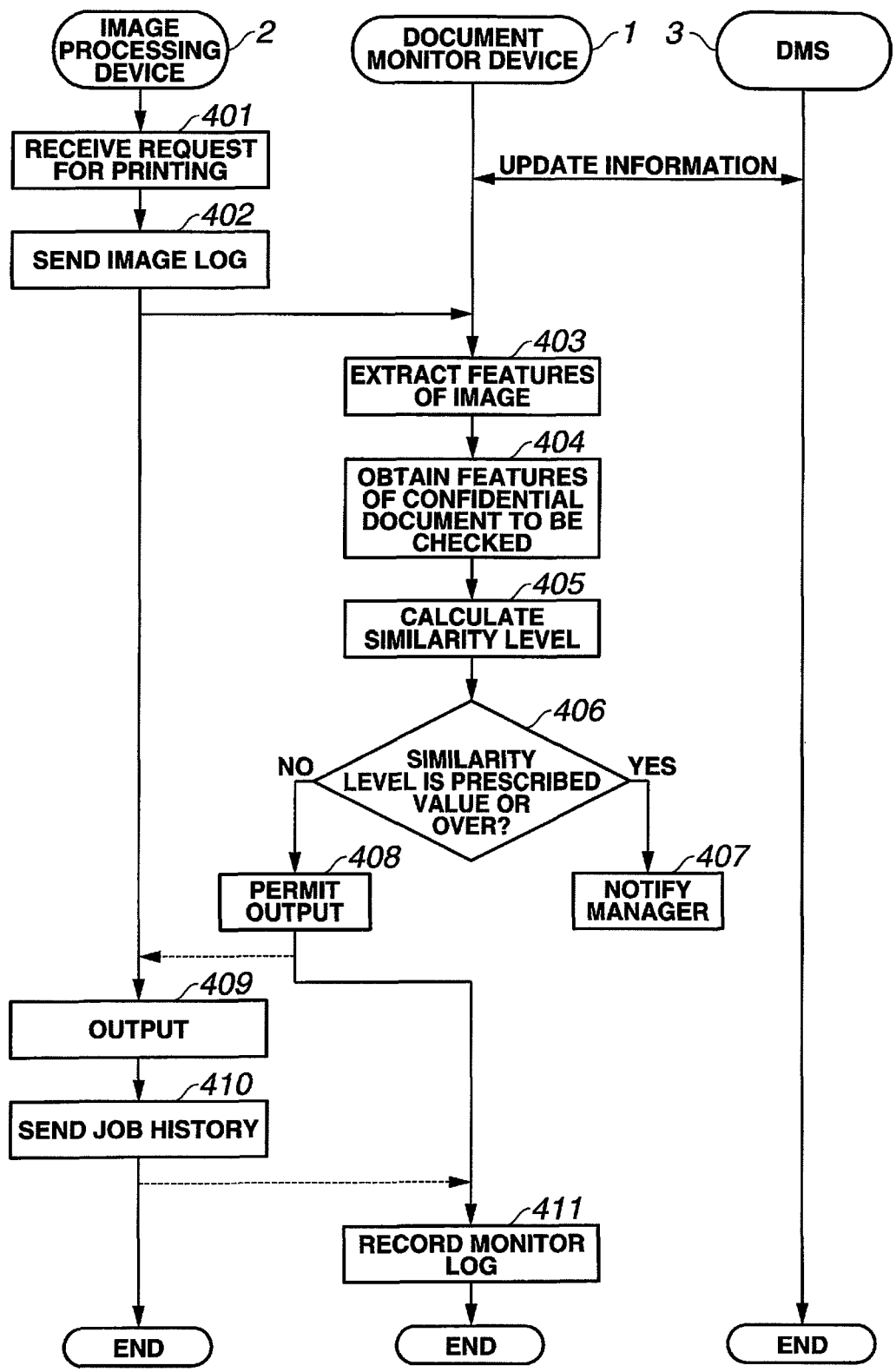
FIG. 4 is a sequence diagram showing a process implemented by the document monitor system 7 at the real time.

FIG. 4 is a sequence diagram showing a process implemented by the document monitor system 7 at the real time immediately after the request for processing the document is made for the image processing device 2.

As shown in FIG. 4, firstly, the image processing device 2 receives a request (e.g. printing) for processing the document (step 401).

The request received by the image processing device 2 is not only the request for printing an electronic document sent from the client PC 4, but also may be a request for processing a document implemented by the image processing device 2, such as a request for a process of copying an original paper document implemented by the image processing device 2, or a request for a process of scanning an original paper document implemented by the image processing device 2.

When the image processing device 2 receives the request for processing the document (step 401), the image processing device 2 generates an image log made up of information indicating details of the process, such as a job name, a user name and date and time, and image data of the document, and sends the image log to the image log reception registration section 11 in the document monitor device 1 (402).

In the document monitor device 1, the image log reception registration section 11 receives the image log sent from the image processing device 2. The image log reception registration section 11 saves the received image log to the image log storage 12.

Then, the document monitor device 1 obtains the image log received from the image processing device 2 and stored in the image log storage 12, and sends the image log to the image log feature extraction section 13. The image log feature extraction section 13 extracts features from the received image log (step 403).

After the features are extracted from the image log (step 403), the similarity level calculation section 17 sends the document selection conditions stored in the similarity level calculation section 17 to the document feature DB 16.

The document feature DB 16 selects the confidential document whose similarity is to be determined at the real time based on the received document selection conditions, and sends the identification number and the features of the selected confidential documents to the similarity level calculation section 17.

The similarity level calculation section 17 receives, from the document feature DB 16, the features of the confidential documents whose similarity is determined (step 404), and compares the features of the image log obtained from the image log feature extraction section 13 with the features obtained from the document feature DB 16 to calculate the similarity level (step 405).

As a result of the calculation for the similarity level implemented by the similarity level calculation section 17, when the calculated similarity level is a prescribed constant value or over (YES in step 406), the notification section 19 notifies the manager PC 5 of a warning information to the effect that the document similar to the confidential document is to be processed in the image processing device 2 (step 407).

On the other hand, as a result of the calculation of the similarity level implemented by the similarity level calculation section 17, when the calculated similarity level is less than the prescribed value (NO in step 406), the similarity level calculation section 17 notifies the image processing device 2 of a permission for processing the document that is a source of the image log whose similarity is determined (step 408).

After receiving the permission for the process, the image processing device 2 implements the process requested in step 401 (step 409), and sends details of the process to the image monitor device 1 as a job history (step 410).

After receiving the job history from the image processing device 2, the document monitor device 1 records a monitor log (step 411).

As described above, in the document monitor system 7, immediately after the image processing device 2 receives the request for processing the document, the confidential documents whose similarity is determined with reference to the image log of the document are selected from all the confidential documents managed in the DMS 3 based on the preset information, and similarity level of the selected confidential documents is determined.

Next, with reference to FIG. 5, a process implemented at the real time by the document monitor device 1 will be described.

Figure 5:
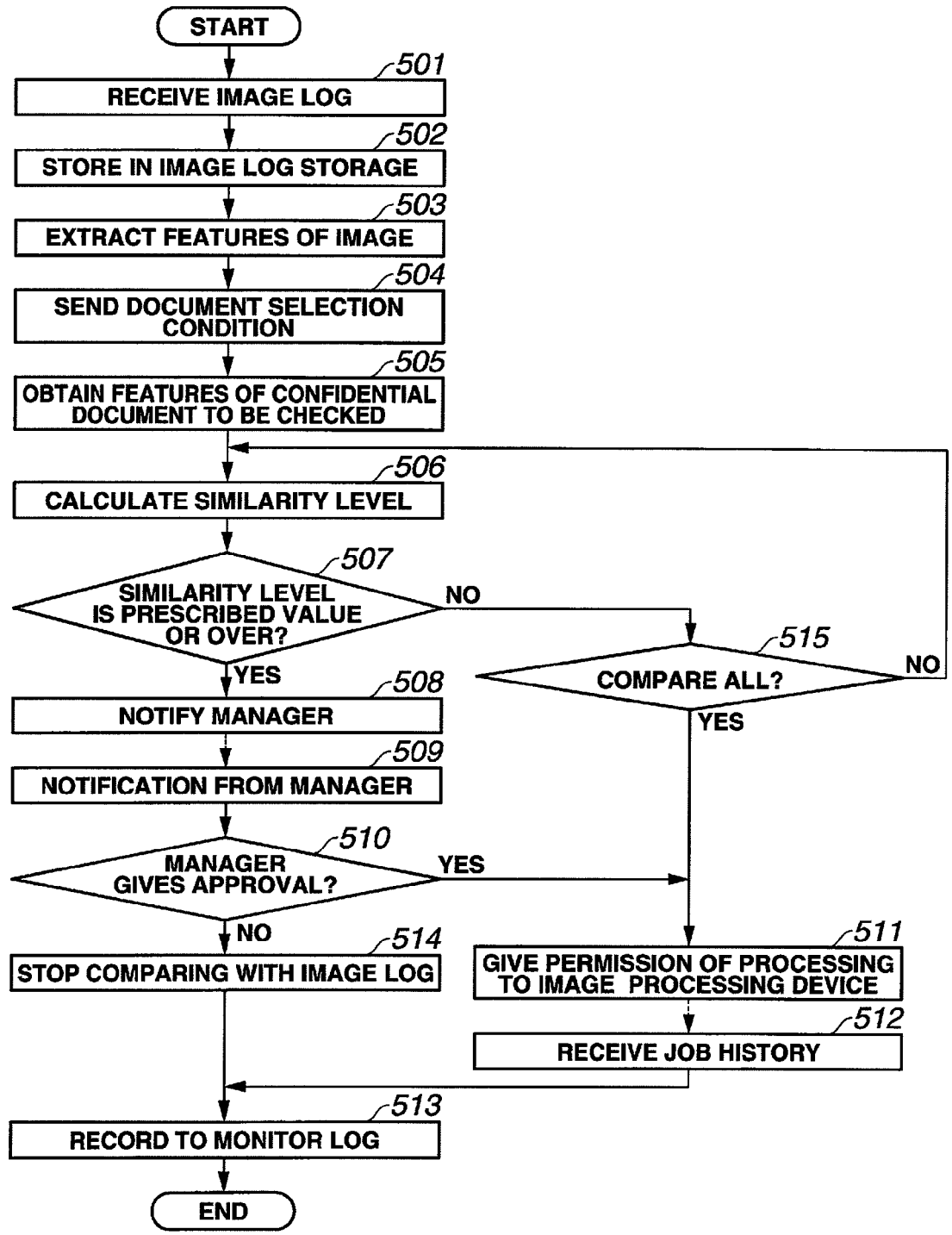
FIG. 5 is a flow chart showing a process implemented by a document monitor device 1 at the real time.

FIG. 5 is a flow chart showing a process implemented by the document monitor device 1 at the real time when the image processing device 2 receives the request for processing the document. This flow chart describes, in detail, the process implemented by the document monitor device 1 in the sequence diagram of FIG. 4.

The document monitor device 1 receives, by the image log reception registration section 11, the image log sent from the image processing device 2 (step 501), and the image log reception registration section 11 saves the received image log to the image log storage 12 (step 502).

Then, the image log feature extraction section 13 extracts the features from the image log stored in the image log storage 12 (step 503).

After the features of the image log are extracted, the similarity level calculation section 17 sends the document selection conditions to the document feature DB 16 (step 504), and the document features DB 16 sends to the similarity level calculation section 17 the identification number and the features of the confidential document whose similarity is determined (step 505).

After obtaining the features of the confidential documents whose similarity is determined (step 505), the similarity level calculation section 17 compares the features of the image log extracted in step 503 with the features of the confidential documents obtained in step 505 to calculate the similarity level (step 506).

The similarity level calculation section 17 determines whether or not the calculated similarity level is a prescribed value or over. The prescribed value is inputted from the display/operation section, which is not shown, and is stored in the similarity level calculation section 17. If the similarity level calculated by the document monitor device is the prescribed value or over (YES in step 507), it is determined that the document of the image log is similar to the confidential document for which the similarity is calculated, and the notification section 19 notifies the manager PC 5 of the warning information (step 508). The content of the notification made by the notification section 19 to the manager PC 5 includes information recorded in the monitor log record section 18, such as a name of the image processing device 2, data and time, a name of user who requests the image processing device 2 for processing, an image log of the document to be processed by the image processing device 2, an ID (identification) of the image log, a job name (printing, copying and so on) for processing the document implemented by the image processing device 2, a location where the image log is recorded, a document ID of a confidential document which is determined to have the similarity, a file name of the confidential document, a location where the confidential document is stored in the DMS 3, the confidentiality level, the freshness level and the distribution level of the confidential document set in the DMS 3 and a calculated similarity level. It should be noted that notification means in the present invention is not limited to specific means. It may be possible to employ any means, provided that it has such notification function as notifying the manager PC 5 of a message, and displaying a pop-up on a screen in response to the notification.

The manage PC 5 that receives the notification from the notification section 19 in the document monitor device 1 displays details of the notification to the manager. The manager makes a visual identification of the notification details displayed in the manager PC 5 to check that the document to be processed by the image processing device 2 is a document similar to the confidential document managed in the DMS 3. Then, the displayed image log is checked by the manager to determine whether or not the processing for the notified details is permitted to be implemented by the image processing device 2, and the determination result (permit or prohibit) is notified to the document monitor device 1.

In the document monitor device 1, the notification section 19 receives the notification from the manager PC 5 (step 509). When the content of the notification received by the notification section 19 from the manager PC 5 indicates that the processing is permitted (YES in step 510), the notification section 19 sends to the image processing device an instruction to permit the processing (step 511). After receiving the instruction to permit the processing, the image processing device 2 implements the permitted processing, and notifies the job history related to the implemented processing to the monitor log record section 18 in the document monitor device 1. In the document monitor device 1, the monitor log record section 18 receives the job history (step 512), and records the monitor log (step 513).

Additionally, in step 510, when the content of the notification received by the manager PC 5 from the notification shows that the processing is determined to be prohibited (NO in step 510), the notification section 19 stops the similarity level calculation section 17 to calculate the similarity level between the features of the image log extracted in step 503 and the features of the confidential document obtained in step 505 (step 514), and the monitor log record section 18 records a monitor log of the similarity calculation of the confidential document whose similarity is a prescribed value or over in step 507 (step 513). As for the details of the recorded monitor log, a description will be made later with reference to FIG. 8.

Additionally, in step 507, when the similarity between the features of the image log and the features of the confidential document is less than the prescribed value (NO in step 507), in a case where the similarity is not determined for all the confidential documents whose similarity is to be determined, the similarity level between the features of the image log and the features of the remaining confidential documents is calculated for the remaining confidential documents whose similarity is not yet determined (step 506). On the other hand, in a case where the similarity is determined for all the confidential documents (the confidential document having the features obtained in step 505) whose similarity is to be determined (YES in step 515), the notification section 19 sends to the image processing device 2 an instruction for permitting the processing of the image log received in step 501 (step 511). Then, after the monitor log record section 18 receives from the image processing device 2 the job history related to the permitted processing (step 512), the monitor log record section 18 records the monitor log (step 513).

Next, with reference to FIGS. 6 and 7, a description will be made of a process implemented at the time (idle time) when processing load in the document monitor system 7 is assumed to be lower, such as nighttime and weekend, which is set in advance, rather than at the time (real time) immediately after the image processing device 2 receives the request for processing the document.

As described with reference to FIG. 2, in the document monitor system 7 in which the document monitor device 1 according to the present invention is employed, the similarity of the image log is determined with reference to only the selected confidential documents at the real time, while, for the confidential documents not determined at the real time, the similarity of the image log is determined at the idle time. The idle time, which is set in advance, will be described with reference to FIG. 6.

FIG. 6 is a table showing the idle time such as nighttime and weekend.

As shown in FIG. 6, the idle time is set to late-night in a weekday, early morning, holiday and so on. For the confidential documents whose similarity is not determined at the real time, the similarity is determined at the idle time. The setting of the idle time shown in FIG. 6 may be set by operating a display/operation section, which is not shown, and be stored in the date and time check section 20. Alternatively, the setting of the idle time may be set through the operation from the client PC 4 or the manager PC 5, and be stored in the date and time check section 20.

Next, with reference to FIG. 7, a process implemented by the document monitor system 7 at the idle time will be described.

Figure 7:
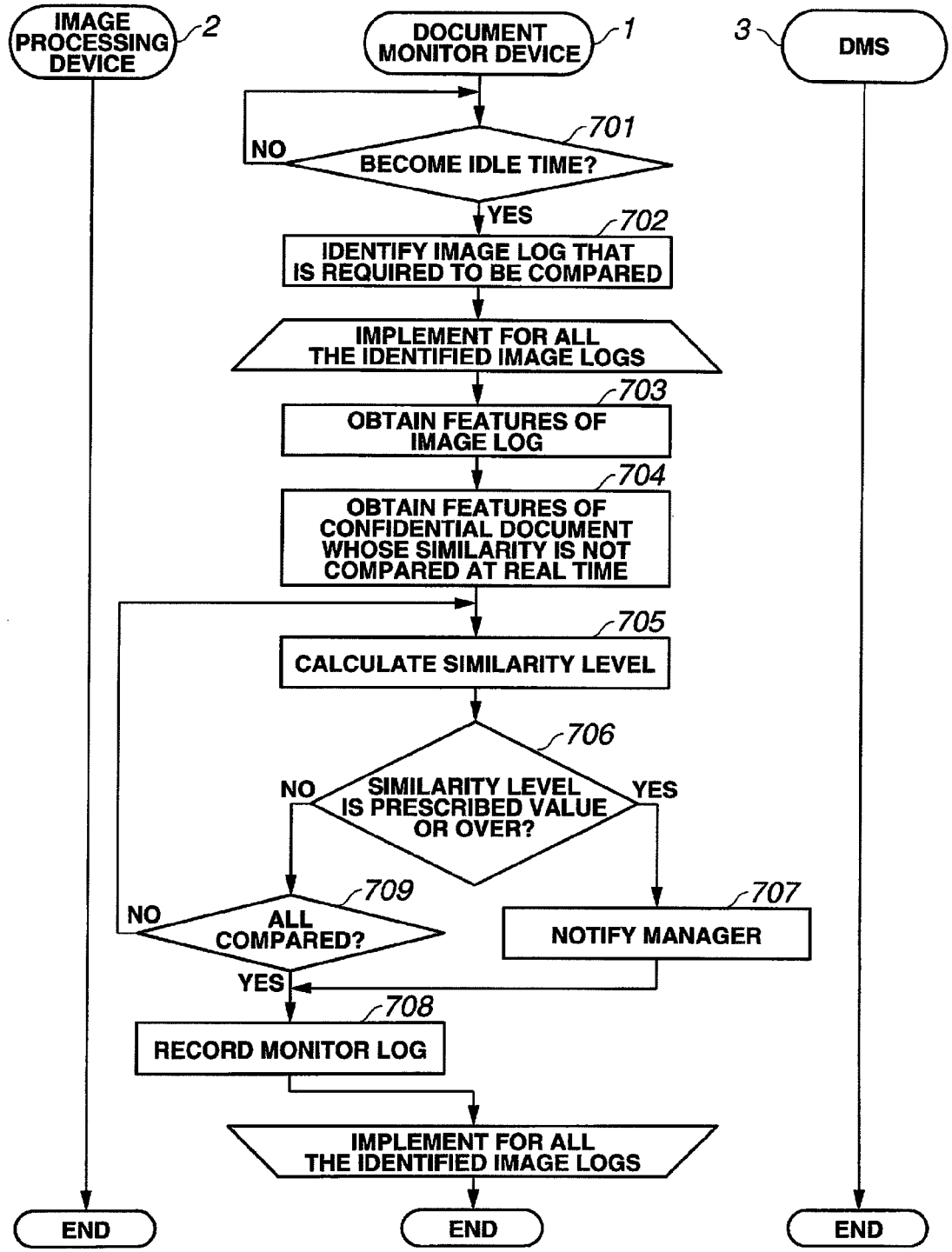
FIG. 7 is a sequence diagram showing a process implemented by the document monitor system 7 at the idle time.

FIG. 7 is a sequence diagram showing a process implemented by the document monitor system 7 at the idle time.

As shown in FIG. 7, when the preset idle time comes (YES in step 701), the date and time check section 20 notifies the similarity level calculation section 17 to that effect. Upon receiving the notification, the similarity level calculation section 17 checks the image logs whose similarity is not determined at the idle time by using the monitor log recorded in the monitor log record section 18 (step 702).

After the image logs whose similarity is not determined at the idle time are identified, the following process is implemented for all the identified image logs (process in steps 703 to 709).

Firstly, features of the image log whose similarity is determined are extracted by the image log feature extraction section 13. Then, the similarity level calculation section 17 obtains the features extracted by the image log feature extraction section 13 (step 703).

The similarity level calculation section 17 sends to the document feature DB 16 the selection conditions for determining the similarity at the idle time from the document section conditions stored in the similarity level calculation section 17, and obtains from the document feature DB 16 identification numbers and features of the confidential documents whose similarity is determined at the idle time (step 704).

Once the features of the confidential document compared at the idle time are obtained, the similarity level calculation section 17 compares the features of the image log with the obtained features of the confidential documents to calculate the similarity level (step 705). The calculation of the similarity is performed for one of the confidential documents and the image log.

When the calculated similarity is the prescribed value or over (YES in step 706), the notification section 19 notifies the manager PC 5 of the warning information (step 707). When the manager PC 5 is not in operation due to the nighttime or weekend, the notification is displayed during the next start up of the manger PC 5. It should be noted that notification means in the present invention is not limited to specific means. It may be possible to employ any means, provided that it has such notification function as emailing or notifying the manager PC 5 of a message and displaying a pop-up on a screen in response to the notification.

After the notification to the manager PC 5 is made, the monitor log record section 18 records the monitor log of the confidential document whose similarity is the prescribed value or over (step 708).

On the other hand, when the similarity level calculated in step 705 is less than the prescribed value (NO in step 706), the next similarity calculation is performed between the features of the image log and the features of the confidential document whose similarity is determined in the next (NO in step 709 to step 705).

As described above, after the similarity is calculated between the features of the image log and the features of all the confidential documents whose similarity is to be calculated (YES in step 709), the monitor log record section 18 records the details of the check made at the idle time to the monitor log.

As described above, by the process in steps 703 through 709, the similarity determination of one image log with all the confidential documents whose similarity is required to be determined is performed. After the process in steps 703 through 709 is implemented for all the image logs that are identified as image logs whose similarity is required to be determined, the process implemented at the idle time is ended.

Next, the monitor log recorded by the monitor log record section 18 will be described with reference to FIG. 8.

FIG. 8 is a table showing the monitor log that the monitor log record section 18 records.

As shown in FIG. 8, the monitor log has items, including "at real time", "at idle time", "date and time", "User", "image log ID", "job", "record location", "similar confidential document ID", "file name", "DMS store location", "confidential level", "freshness level", "distribution level", "similarity level", "Check", and each of the items is recorded.

"At real time" refers to a check item showing that the similarity with the confidential document is calculated at the real time.

"At idle time" refers to a check item showing that the similarity with the confidential document is calculated at the idle time.

"Date and time" refers to a date and time when the image processing device 2 receives a request for processing a document of an image log.

In "User," a name of a user who intends to process the document of the image log in the image processing device 2 is recorded.

In "image log ID," an identification number that is designated to each of the image logs is recorded.

In "job," information on the process received by the image processing device 2 is recorded. Such information includes the details for processing the document, and details for printing, copying and so on are recorded.

"Record location" refers to a storage location where the image log is stored in the image log storage 12.

In "similar confidential document ID," an identification number for the confidential document determined to have a similarity level higher than a prescribed value as a result of similarity level determination with the image log is recorded.

In "file name," a file name of a confidential document indicated by the similar confidential document ID is recorded.

In "DMS store location," a store location of a confidential document indicated by the similar confidential document ID in the DMS 3 is recorded.

In "confidential level," a confidential level of a confidential document indicated by the similar confidential document ID recorded in the document feature DB 16 is recorded.

In "freshness level," a freshness level of a confidential document indicated by the similar confidential document ID recorded in the document feature DB 16 is recorded.

In "distribution level," a distribution level of a confidential document indicated by the similar confidential document ID recorded in the document feature DB 16 is recorded.

In "similarity level," in a case where a similarity level is determined to be a prescribed value or over as a result of similarity level determination with the image log, such similarity level is recorded.

In a case where there is a confidential document having a similarity level with the image log higher than a prescribed value or over, warning information is notified to the manager PC 5. The item "check" shows whether or not the manager checks, in response to such notification, that the document having a similarity with a confidential document is to be processed by the image processing device 2. In "check," "checked" is recorded at the time when a notification of permission/prohibition of the processing is received from the manager PC 5, which is an object of the notification of the warning information, regarding that the manager checks the notification of the warning information.

As described above, for the confidential document whose similarity is determined with reference to the document to be processed by the image processing device 2, a description is made that the confidential documents are divided into confidential documents whose similarity is determined at the real time and confidential documents whose similarity is determined at the idle time. For such division, as described with reference to FIGS. 3A and 3B, a description is made that the similarity of the confidential documents that fall into the conditions of the preset confidential level, freshness level and distribution level is determined at the real time, while the similarity of the confidential documents that do not fall into the conditions is determined at the idle time. However, it may be possible to employ a configuration in which, for the confidential documents managed in the DMS 3, a priority order is set based on the confidential level, the freshness level and the distribution level, and the similarity is determined only for a limited quantity of the confidential documents based on the rank of the preset priority order.

Next, with reference to FIGS. 9A and 9B, a description will be made of a case where the similarity determination at the real time is performed only for the preset quantity of confidential documents.

FIGS. 9A and 9B are diagrams showing the division between the confidential documents whose similarity is determined at the real time and the confidential documents whose similarity is determined at the idle time, the division being set to the confidential documents managed in the DMS 3. FIG. 9A is a configuration diagram of a setting screen for selecting the confidential documents whose similarity is determined by the similarity level calculation section 17 in the document monitor device 1. FIG. 9B is a table showing the confidential documents selected to determined the similarity among the confidential documents managed in the DMS 3 based on the information set through the screen in FIG. 9A.

As shown in FIG. 9A, the setting for the document selection conditions, which are conditions for selecting the confidential documents whose similarity is determined at the real time, is made through setting the confidential level, the freshness level, the distribution level of the confidential documents managed in the DMS 3 and the quantity. As described with reference to FIG. 3A, the settings of the document selection conditions may be determined through the operation from the display/operation section, which is not shown and is provided to the document monitor device 1, and the determined document selection conditions may be stored in the similarity level calculation section 17. Furthermore, it may be possible to employ a configuration in which the document selection conditions are determined through the operation from the client PC 4 or the manager PC 5, and are stored in the similarity level calculation section 17.

When a priority level for each of the confidential documents managed in the DMS 3 is determined based on each of the confidential level, the freshness level and the distribution level as shown in FIG. 9A, and the confidential documents are arranged in accordance with the priority level, the similarity of only a preset quantity of the confidential documents is determined in the order from a confidential document with the top priority level among the confidential documents arranged as shown in FIG. 9B. The quantity of the confidential documents whose similarity is determined is set through the setting screen for setting the priority level as shown in FIG. 9A. It should be noted that the selection of the confidential documents may be made by selecting the identification numbers that are uniquely designated to each of the confidential documents.

As described above, with reference to FIGS. 3A, 3B, 9A and 9B, the confidential documents managed in the DMS 3 are described by separating the confidential documents into two categories, in other words, the confidential documents whose the similarity is determined at the real time and the confidential documents whose similarity is determined at the idle time. However, it may be possible to employ a configuration in which the confidential documents managed in the DMS 3 are separated into three or more categories in accordance with the handling.

Next, with reference to FIGS. 10A and 10B, a description will be made of a case where the confidential documents managed in the DMS 3 are separated into three or more categories, and handling in connection with the similarity determination of the confidential documents varies in accordance with the separated categories.

FIGS. 10A and 10B are diagrams showing a case where the confidential documents managed in the DMS 3 are separated into three or more categories, and the handling for the similarity determination of the confidential documents varies in accordance with the separated categories. FIG. 10A is a configuration diagram of a setting screen showing the details of the settings. FIG. 10B is a diagram showing that the handling varies in accordance with the confidential documents selected based on the details of the setting made through the screen in FIG. 10A.

As shown in FIG. 10A, the confidential documents managed in the DMS 3 are separated into three or more categories in connection with the similarity determination.

When a priority level of each of the confidential documents is determined based on the confidential level, the freshness level and the distribution level, and the confidential documents are arranged based on the priority level, the top two confidential documents are set to confidential documents in which the similarity determination is performed at the real time, and if it is determined that the similarity level exceeds a prescribed value, the processing in the image processing device 2 is prohibited regardless of the approval/refusal made by the manager. The confidential documents with 3rd to 4th priority levels are set to confidential documents in which the similarity determination is performed at the real time, if it is determined that the similarity level exceeds the prescribed value, the processing in the image processing device 2 is permitted, provided that the approval is obtained from the manager. The confidential documents with 5th to 6th priority levels are set to confidential documents in which the similarity is determined at the time when utilization rate of a CPU (Central Processing Unit) in the document monitor device 1 is low. The confidential documents with 7th to 10th priority levels are set to confidential documents in which the similarity is determined at a preset time such as nighttime.

When the confidential documents managed in the DMS 3 are set as shown in FIG. 10A, the confidential documents managed in the DMS 3 are arranged as shown in FIG. 10B in accordance with the priority levels based on the confidential level, the freshness level and the distribution level. Then, the confidential documents are differently treated in accordance with the order of the priority levels. Additionally, the confidential documents are selected based on the identification number that is uniquely designated to each of the confidential documents.

As described above, the confidential documents managed in the DMS 3 may be separated into three or more categories in accordance with the treatment on the similarity determination, and the similarity determination may be treated differently for each of the separated categories. In the case where the similarity determination is performed differently for each of the separated categories, features of the confidential documents, together with treatment information corresponding to the treatment for each of the confidential documents are sent from the document feature DB 16 to the similarity level calculation section 17, and then, the document monitor device 1 performs operation in accordance with the sent treatment information when the similarity level is a prescribed value or over. A CPU detection section for detecting the CPU utilization rate in the document monitor device 1 may be employed in this case.

It should be noted that, in the document monitor system 7, it may be possible to employ a print server, a printer driver or a printer capable of receiving a request for printing out an electronic document in place of the image processing device 2, provided that they can process the electronic document.

It should be noted that the idle time may be not only set by presetting a time period as described with reference to FIG. 6, but also set by providing the document monitor device 1 with a detector that detects an idle status of the document monitor device 1 or the document monitor system 7 and detecting the occurrence of an idle status to set it as the idle time.

The description above is made of a case where, when the similarity level is a prescribed value or over as a result of the similarity calculation at the real time, the document monitor device 1 notifies the manager PC 5, and a notification of permission/prohibition is made from the manager PC 5 to the document monitor device 1. However, it should be noted that it may be possible to employ a configuration in which, in the document monitor system 7, when the similarity level is a prescribed value or over as a result of the similarity calculation at the real time, the notification is made only from document monitor device 1 to the manager PC 5.

The description above is made of a case where, when the similarity level is a prescribed value or over as a result of the similarity calculation in the document monitor device 1, the document monitor device 1 notifies the manager PC 5, and a notification of permission/prohibition is made from the manager PC 5 to the document monitor device 1. However, it should be noted that it may be possible to employ a configuration in which, in the document monitor system 7, when the similarity level is the prescribed value or over, the document monitor device 1 notifies the manager PC 5 of the warning information, and notifies the image processing device 2 of a prohibition of processing the document that is determined to have the similarity. In this configuration, processing the document determined to have the similarity is permitted only after the manager PC 5 receiving the warning information notifies the document monitor device 1 of permission of processing the document determined to have the similarity, and the document monitor device 1 notifies the image processing device 2 of the permission of processing the document determined to have the similarity.

The description above is made of a case where, when the similarity level is a prescribed value or over as a result of the similarity calculation in the document monitor device 1, the warning information is notified to the manager PC 5. However, it should be noted that it may be possible to employ a configuration in which, in the document monitor system 7, the warning information is notified to the creator of the confidential document when the similarity level is the prescribed value or over. In this configuration, the warning information is notified by the notification section 19 to the contact address of the creator of the confidential document stored in the document feature DB 16. Additionally, it may also be possible to employ a configuration in which, in the document monitor system 7, when the similarity level is the prescribed value or over as a result of the similarity calculation in the document monitor device 1, the warning information is notified to the creator of the confidential document having the similarity of the prescribed value or over while the prohibition of processing the document having the similarity is notified to the image processing device 2.

It should be noted that the DMS monitor section 14, the document feature extraction section 15 and the document feature DB 16 are provided to the document monitor device 1. However, the DMS monitor section 14, the document feature extraction section 15 and the document feature DB 16 may be provided to the DMS 3, rather than to the document monitor device 1.

It should be noted that it may be possible to employ a configuration in which the features extracted at the real time are stored in the image log storage 12 as information on the image log, while, at the idle time, the features of the image log stored in the image log storage 12 are not extracted by the image log feature extraction section 13, but is obtained by the similarity level calculation section 17.

It should be noted that the document monitor device 1 may be realized by applying a program having a function of the document monitor device 1 to a computer having a storage device.

The present invention is applicable to a document monitor device, a recording medium storing a document monitor program, a document monitor system, and a document monitor method.

Additionally, the same effect as the exemplary embodiment above may be obtained by supplying a recording medium storing a software program for realizing the function of the exemplary embodiment above, and reading out the program stored in the recording medium through a communication device and so on to implement the program.

The recording medium for supplying the program may be, for example, a CD-ROM, a DVD, an SD card, or a server for providing the program.

The foregoing description of the exemplary embodiment of the present invention is provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document monitor device including at least one central processing unit (CPU), the document monitor device comprising:
 a confidential information storage section that stores confidentiality level information of documents managed in a document management device in association with identification information of each of the documents;

a feature storage section that stores features of the documents managed in the document management device in association with the identification information;

a selection section that, using the at least one CPU, selects a target document from the documents managed in the document management device based on document selection conditions and the confidentiality level information stored in the confidential information storage section;

an acquisition section that acquires a target image to be processed by an image processing device;

an extraction section that, using the at least one CPU, extracts features of the target image acquired by the acquisition section;

a similarity level calculation section that, using at least one CPU, determines a similarity level between the features stored in the feature storage section in association with the identification information of the target document selected by the selection section, and the features of the target image extracted by the extraction section; and a detection information output section that, when the similarity level determined by the similarity level calculation section is a prescribed value or over, outputs information indicating that a similar image is detected, wherein the similarity level calculation section separates the documents managed by the document management device into confidential documents whose similarity is to be determined at real-time, and remaining documents whose similarity is to be determined at an idle time, and the selection section selects the target document from the confidential documents in real-time when the target image is acquired; and wherein, during an idle time, the similarity level calculation section compares features of the remaining documents with the features of the target image and determines similarity levels indicating a similarity level of the features, and the detection information output section, when the similarity level determined by the similarity level calculation section is a prescribed value or over, outputs information indicating that a similar image is detected.

2. The document monitor device according to claim 1, wherein
the confidentiality level information is added by the document management device in correspondence with each of the documents.

3. The document monitor device according to claim 2, wherein
the confidentiality information includes a confidentiality level set corresponding to each of the documents, a distribution level indicating a frequency of use of each of the documents, and a freshness level indicating an elapsed time from registration to the document management device.

4. The document monitor device according to claim 1, wherein the features stored in the feature storage section include at least one of a file name, a storage location, a registration date, or a contact address of a document creator.

5. A non-transitory computer readable recording medium storing a document monitor program that causes a computer to execute a process, the process comprising:
storing confidentiality level information of documents managed in a document management device in association with identification information of each of the documents;

storing features of the documents managed in the document management device in association with the identification information;

selecting a target document from the documents managed in the document management device based on document selection conditions and the stored confidentiality level information;

acquiring a target image to be processed by an image processing device;

extracting features of the acquired target image;

comparing the features stored in association with the identification information of the selected target document and the extracted features of the target image;

determining a similarity level indicating a level of similarity of the features, based on the comparison; and outputting, when the calculated similarity level is a prescribed value or over, information indicating that a similar image is detected, wherein
the documents managed by the document management device are separated into confidential documents whose similarity is to be determined at real-time, and remaining documents whose similarity is to be determined at an idle time, and the target document is selected from the confidential documents in real-time when the target image is acquired; and wherein, during an idle time, the features of the remaining documents are compared with the features of the target image and similarity levels indicating a similarity level of the features are determined, and when the determined similarity level is a prescribed value or over, information indicating that a similar image is detected is output.

6. The non-transitory computer readable recording medium according to claim 5, wherein the features stored in association with the identification information of the selected target document include at least one of a file name, a storage location, a registration date, or a contact address of a document creator.

7. A document monitor system, comprising
a document management device that manages documents;
an image processing device that processes images; and
a document monitor device that can communicate with the document management device and the image processing device,
the document monitor device including:
a confidential information storage section that stores confidentiality level information of documents managed in the document management device in association with identification information of each of the documents;
a feature storage section that stores features of the documents managed in the document management device in association with the identification information;
a selection section that selects a target document from the documents managed in the document management device based on document selection conditions and the confidentiality level information stored in the confidential information storage section;
an acquisition section that acquires a target image to be processed by the image processing device;
an extraction section that extracts features of the target image acquired by the acquisition section;
a similarity level calculating section that compares the features stored in the feature storage section in association with the identification information of the target document selected by the selection section and the features of the target image extracted by the extraction section, and calculates a similarity value indicating a level of similarity of the features, based on the comparison; and a detection information output section that, when the similarity value calculated by the similarity level calculation section is a prescribed value or over, outputs information indicating that a similarity image is detected, wherein the similarity level calculation section separates the documents managed by the document management device into confidential documents whose similarity is to be determined at real-time, and remaining documents whose similarity is to be determined at an idle time, and the selection section selects the target document from the confidential documents in real-time when the target image is acquired; and wherein, during an idle time, the similarity level calculation section compares features of the remaining documents with the features of the target image and determines similarity levels indicating a similarity level of the features, and the detection information output section, when the similarity level determined by the similarity level calculation section is a prescribed value or over, outputs information indicating that a similar image is detected.

8. The document monitor system according to claim 7, wherein the features stored in the feature storage section include at least one of a file name, a storage location, a registration date, or a contact address of a document creator.

9. A document monitor method, comprising:

storing confidentiality level information of documents managed in a document management device in association with identification information of each of the documents;

storing features of the documents managed in the document management device in association with the identification information;

selecting a target document from the documents managed in the document management device based on document selection conditions and the stored confidentiality level information;

acquiring a target image to be processed by an image processing device;

extracting features of the acquired target image;

comparing the features stored in association with the identification information of the selected target document and the extracted features of the target image;

calculating a similarity value indicating a level of similarity of the features, based on the comparison; and outputting, when the calculated similarity value is a prescribed value or over, information indicating that a similar image is detected, wherein the documents managed by the document management device are separated into confidential documents whose similarity is to be determined at real-time, and remaining documents whose similarity is to be determined at an idle time, and the target document is selected from the confidential documents in real-time when the target image is acquired; and wherein, during an idle time, the features of the remaining documents are compared with the features of the target image and similarity levels indicating a similarity level of the features are determined, and when the determined similarity level is a prescribed value or over, information indicating that a similar image is detected is output.

10. The document monitor method according to claim 9, wherein the features stored in association with the identification information of the selected target document include at least one of a file name, a storage location, a registration date, or a contact address of a document creator.

* * * * *